2,700,682
Patented Jan. 25, 1955

2,700,682

KETIMINES AND PROCESS OF PREPARING SAME

Richard Nelson Blomberg, Drexel Hill, and William F. Bruce, Havertown, Pa., assignors, by mesne assignments, to American Home Products Corporation, New York, N. Y., a corporation of Delaware No Drawing. Application June 24, 1948, Serial No. 35,058

11 Claims. (Cl. 260—566)

This invention relates to the preparation of imino compounds and more particularly relates to the preparation of specific imino compounds and their utilization in the preparation of valuable amines and derivatives thereof.

In the prior art it is found that condensation reactions of aldehydes with either ammonia or organic amines can take place without great difficulty, the products formed being aldehyde-ammonias or aldimines. However, in attempting the condensation of ketones and organic primary amines, it has heretofore been found either that the reaction would not take place as expected or that the products isolated were not ketimines as one might expect but complex condensation or polymerized products.

This invention involves the discovery of a process for successfully obtaining imines by the condensation of a ketone with a primary amine and in utilizing the imines produced for obtaining valuable amino compounds. By the use of the aforesaid imines, corresponding amino compounds may be prepared. Thus, valuable amino compounds can be synthesized from readily available substances and with far fewer steps than heretofore thought possible, and in good yield.

Considering initially the preparation of desirable imines, the reaction of a ketone and a primary amine may be represented by the following general equations:

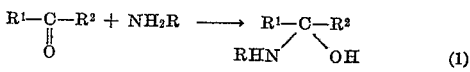

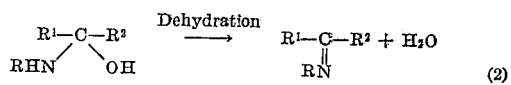

In the above equations the ketone may be a cycloalkyl type or $R^1$ and $R^2$ may represent an alkyl or aralkyl radical or a substituted aralkyl radical while R is intended to represent a lower alkyl radical, such as methyl or ethyl. By substituted aralkyl it is intended that one or more of the hydrogen atoms on the ring may be replaced by an alkyl, amino, chloro, hydroxy or lower alkoxy radical, or in fact any non-interfering substituent or substituents.

In accordance with this invention, it has been found that specific ketones can successfully be combined with specific primary amines to form stable imino products by operating in an alkaline environment, removing water with an alkaline dehydrating agent and taking care that the imino compound is formed in the substantial absence of oxygen. The initial addition of ketone and nitrogenous reagent produces an intermediate product which may be isolated if desired. The addition product is then dehydrated by the use of a selected dehydrating agent. The water and dehydrating agent is thereafter removed from the reaction mixture to obtain the desired imino compound.

The proportions of the reactants are not critical or controlling since the condensation may take place equally well whether the reactants are on an equimolar basis or whether one is in excess. When operating on a batch procedure, it has been found good practice to have that reactant in excess which is more easily removable from the reaction process after the reaction is completed. For example, when one reacts acetone with methylamine, the latter is preferably used in excess since it is easier to remove it from the mixture once the reaction has been terminated.

One advantageous method of carrying out the addition reaction is to use such temperature and pressure conditions that the amine can be maintained in liquid form. Thus, when operating at normal atmospheric pressure, temperatures from about 0° to as low as about —80° C. can be utilized with low boiling reactants. In general, the best temperature for liquid phase operation depends on the boiling point of the lower boiling reactant used and is selected to be somewhat below this point.

In one method of operation, the reaction mixture within the temperature range aforesaid and containing the addition product of ketone and amine is cooled to the point where the addition product solidifies. Thereafter, an alkaline solid dehydrating agent is added in an amount at least sufficient to combine with and remove a substantial amount of water. Suitable alkaline dehydrating agents are those strongly alkaline compounds whose cations fall within the Group IA and Group IIA metals of the Periodic table. These may be used either singly or in admixture. As examples of particularly effective dehydrating agents may be mentioned potassium hydroxide, potassium carbonate, calcium oxide and mixtures of sodium hydroxide and at least about 10% potassium hydroxide, by weight. Surprisingly, sodium hydroxide by itself has been found to be only weakly effective in removing water.

The dehydration step may be carried out at a temperature range of from about 5° to 80° C. and preferably at room temperature because of convenience and under such conditions as to exclude oxygen. In order to exclude oxygen, the reactants may be held in a vessel capable of withstanding pressure and an inert or reducing gas such as ethane, propane, carbon monoxide, helium, nitrogen or hydrogen may be added. It has been found, for best results, that dehydration should be carried out until approximately 80–90% of the water has been removed. The time for terminating the dehydration operation is determined by observing either the extent of solution of the dehydrating agent and by weighing the separated water layer or by observing the change in volume or weight of the dehydrating agent. If less than about 80% of the theoretical amount of water has been obtained, more agent may be added and the reaction permitted to go on for an additional length of time.

The organic product is distilled under conditions excluding the presence of oxygen. This may be carried out by passing a stream of inert or reducing gas through the distilling zone, using such gases as indicated above, or if desired, in the presence of a small amount of antioxidant, such as hydroquinone.

In a variation of the above method involving a more preferred procedure for obtaining imines, the addition product is not separately obtained but the amine is added to the dehydrating agent followed by the addition of ketone. The reaction temperature is held at a point at which the particular dehydrating agent effectively removes the water. When the removal of water is substantially complete the organic product is distilled. It must be emphasized that here, as well as in the first procedure described, oxygen must be excluded from the reaction during the formation of the imine since degradation products and possibly polymerized products are formed when even small amounts of oxygen are present.

The procedures as broadly described above may be used to prepare a large number of useful imino compounds, depending on the initial ketone used. A particularly important group of compounds may be prepared, for example, when starting with such ketones as acetone, 4-methyl-2-hexanone, 2-heptanone, 4-methyl-2-heptanone, 6-methyl-2-heptanone, phenylacetone, para or meta tolyl acetone, anisyl acetone, vanillyl acetone, piperonyl acetone, and others of like nature having the general formula

where $R^1$ and $R^2$ represent the radicals as indicated above.

Turning now to the utilization of the novel imines produced as indicated above, these compounds are not only highly useful as intermediates in preparing amines, as will be described below, but are useful per se as copolymerizers for obtaining useful liquid or solid polymer products, compounding agents for rubber, as antioxidants for various substances such as gasoline, as intermediates in the preparation of antihistaminic compounds, and of course as intermediates in other organic reactions as would be obvious to one skilled in the art. A particularly important field of use for the novel imino compounds of the invention is as intermediates in the preparation of special amino compounds as will now be described.

Certain amino compounds are known to possess physiological actions that are highly useful in the medical field. For example, certain classes of amines have a physiological action which is variously referred to as a pressor, vasoconstrictor or sympathomimetic action. Other amines may have central nervous stimulating action and still other amines may have combined actions. The imines, prepared as described above, can thus be used to obtain from simple starting substances important amino compounds which heretofore required complicated and lengthy procedure for their syntheses.

A pressor and central nervous stimulating amine compound such as the well-known dl-desoxyephedrine can easily be prepared merely by hydrogenating the N-methyl imine of phenylacetone. The hydrogenation can be carried out by dissolving the ketimine in any suitable solvent, such as various alcohols, esters, hydrocarbons, etc., and hydrogenating in the presence of a hydrogenation catalyst such as nickel, platinum or palladium, either alone or on a carrier such as charcoal, kieselguhr, or alumina, silica, asbestos, etc. under the usual hydrogenation conditions.

In this manner, one may thus prepare the N-alkyl derivatives of 2-amino heptane, 1-m-tolyl-2-aminopropane; 1-p-tolyl-2-aminopropane; 1 - m - hydroxyphenyl-2-aminopropane; 1-p-hydroxyphenyl-2-aminopropane; or 1-(m,p-dihydroxyphenyl)-2-aminopropane, depending on the particular imine one uses which in turn merely depends on the particular ketone and alkyl amine used in the imino preparation.

EXAMPLE 1

Preparation of the N-methyl imine of phenylacetone

To 31 g. (1.0 mole) of liquid methyl amine in a flask fitted with a Dry Ice reflux condenser was added over a period one hour with rapid stirring 134 g. (1.0 mole) of phenylacetone. Stirring was continued for one hour at room temperature, when 25 g. of potassium hydroxide pellets were added. After standing overnight at 5° C., the water removed by the alkali indicated the reaction had gone to about 70% completion. The organic layer was separated and 7 g. of potassium hydroxide added and again allowed to stand overnight at 5°. The reaction, by water removal, had gone to 90% theory. Separation of the organic layer and distillation at 1.0 mm. in nitrogen atmosphere over 4 g. of potassium hydroxide yielded a colorless liquid product having the following properties: B. P. 63–66° C. $n_D^{20}$ 1.5270

$$d_{20}^{20}\ 0.9631$$

EXAMPLE 2

Preparation of 1-phenyl-2-methylaminopropane (desoxyephedrine)

20.6 grams of the ketimine as produced in Example 5 was dissolved in 45 cc. of ethyl acetate as a solvent. To this was added 10 grams of 5% palladium on charcoal and the mixture reduced by the addition of hydrogen until 1.39 moles of hydrogen was absorbed. The catalyst was removed and the product distilled. Distillation gave the desired desoxyephedrine boiling at 58.0–61.5° C. at 1.1 mm. pressure. The formation of the picrate M. P. 123–124° C., gave no depression of a mixed melting point with the picrate of a known sample of desoxyephedrine, M. P. 122–123° C.

EXAMPLE 3

Preparation of N-methyl-β,β'-diphenyl isopropylidenimine

To 15.8 g. (0.075 mole) of dibenzyl ketone in a pressure flask at −10° C. was added 4.5 g. of potassium hydroxide pellets and 7 g. (200% excess) of methylamine. The flask was stoppered after removing the air by an inert gas, and allowed to remain at 25° C. for 18 hours when it was cooled to 5°. The pressure was vented and the contents removed by washing with 20 cc. of benzene followed by 10 cc. of ether. The organic layer was filtered by suction and the filtrate (red color) was distilled at reduced pressure in the absence of oxygen to produce a fraction of 12 g., B. P. 137–8° at 0.9 mm., which had a neutral equivalent of 370, calc. 223; $n_D^{25}$ 1.5838. The ketimine obtained rapidly became colored when exposed to air.

Reduction of N-methyl-β,β'-diphenylisopropylidenimine

The N-methyl-β,β'-diphenylisopropylidenimine, 7.18 g. (0.032 mole), was shaken with hydrogen in the presence of 0.5 g. of 5% palladium on charcoal using 20 cc. of ethyl acetate as a solvent. Absorption was rapid at the beginning but soon became sluggish. The reduction was kept going by the addition of an equal weight of catalyst followed by one gram of Raney nickel. After seven days the reduction had ceased with the absorption of 0.024 mole of hydrogen. The catalyst was removed by filtration and the filtrate was heated on a steam bath with 40 cc. of 30% sulfuric acid for 30 minutes. After cooling the solution was extracted with 50 cc. of ether, discarding the ether extract, and brought to pH 2 with 40% sodium hydroxide. One more extraction with ether followed by filtration through Nuchar produced a colorless clear solution. The aqueous solution was made basic to pH of 10–11 with 40% sodium hydroxide and extracted with two 100-cc. portions of ether. The extract after drying over sodium hydroxide was heated on a water bath at 60° at a pressure of 150 mm. to remove the ether; the residue weighed one gram, which on distillation produced 0.6 g. of N-methyl-β,β'-diphenylisopropylamine, B. P. 130–40° at 0.2 mm., neutral equivalent: calc. 225, found 222; $n_D^{25}$ 1.5642, $n_D^{20}$ 1.5663.

The foregoing examples have been given in order to disclose illustrative examples in preparing valuable imines and amine derivatives and should not be considered limitative of the invention. With regard to the amino products, these are useful not only as intermediates in the preparation of other organic compounds but, as was pointed out above, most of them are also useful from a pharmacological viewpoint since they possess a marked sympathomimetic action whether in the form of the free base or as salts. The latter may be formed from the free base by methods now well-known in the art and need not be described here. As examples of amine salts, which have been found to be most suitable for pharmacological use, may be mentioned the hydrochloride, the sulfate, the phosphates, particularly the primary phosphate, and the benzoate salts.

Having described our invention, we claim:

1. The process for preparing imines comprising reacting a primary lower alkyl amine in the liquid phase with a ketone of the formula $$R^1\text{---CO---}R^2$$

wherein $R^1$ and $R^2$ each represents an aralkyl selected from the group consisting of phenyl-lower alkyl, hydroxyphenyl-lower alkyl, lower alkoxyphenyl-lower alkyl, lower alkylphenyl-lower alkyl, aminophenyl-lower alkyl, chlorophenyl-lower alkyl and piperonyl radicals and $R^2$ additionally representing an alkyl radical, the reaction thus forming an addition compound containing a hydroxyl group as a reaction product, removing water from the reaction product by reacting the latter at a temperature below about 80° C. with a dehydrating agent comprising an alkaline compound selected from the group consisting of potassium hydroxide, a strongly alkaline potassium salt of an inorganic acid, and alkaline earth metal oxides, said steps being carried out under conditions to prevent oxidation.

2. The process of claim 1; wherein the alkaline dehydrating agent is potassium hydroxide.

3. The process of claim 1; wherein the alkaline dehydrating agent is potassium carbonate.

4. The process of claim 1; wherein the alkaline dehydrating agent is calcium oxide.

5. The process of preparing imines comprising reacting a primary lower alkyl amine in the liquid phase with a ketone of the formula $$R^1\text{---X---CO---Alkyl}$$

wherein X represents a lower alkylene radical and $R^1$ represents a monocyclic, carbocyclic aromatic radical, thus forming an addition compound containing a hydroxyl group as a reaction product, removing water from the reaction product by reacting the latter at a temperature below about 80° C. with an alkaline dehydrating agent comprising essentially an alkaline compound of the group consisting of potassium hydroxide, a strongly alkaline potassium salt of an inorganic acid, and alkaline earth metal oxides, the steps being carried out under conditions to prevent oxidation.

6. The process of preparing imines comprising reacting a primary lower alkyl amine in the liquid phase with a ketone of the formula $$R^1-X-CO-Y-R^2$$

where X and Y stand for lower alkylene radicals and $R^1$ and $R^2$ stand for monocyclic, carbocyclic aromatic radicals, thus forming an addition compound containing a hydroxyl group as a reaction product, and removing water from the reaction product by reacting the latter at a temperature below about 80° C. with a dehydrating agent comprising essentially an alkaline compound selected from the group consisting of potassium hydroxide, a strongly alkaline potassium salt of an inorganic acid, and alkaline earth metal oxides, said steps being carried out under conditions to prevent oxidation.

7. The process of preparing the N-methyl imine of phenylacetone which comprises reacting phenylacetone with methyl amine and removing water from the reaction product by reacting the latter with an alkaline dehydrating agent of the group consisting of potassium hydroxide, a strongly alkaline potassium salt of an inorganic acid, and alkaline earth metal oxides, the desired imine product being produced under conditions to prevent oxidation.

8. The process for the preparation of dl-desoxyephedrine which comprises, reacting methyl amine with phenylacetone under relatively low temperature conditions and below the boiling point of the amine, forming an addition compound containing a hydroxyl group as a reaction product, dehydrating the reaction product at a temperature below about 80° C. by contacting it with a dehydrating agent comprising essentially an alkaline compound selected from the group consisting of potassium hydroxide, a strongly alkaline potassium salt of an inorganic acid, and alkaline earth metal oxides, removing the combined dehydrating agent and water, separating the N-methyl imine of phenylacetone from the organic layer, dissolving said imine in an organic solvent, hydrogenating said imine in the presence of a hydrogenating catalyst and separating dl-desoxyephedrine from the reaction products, all of said steps being carried out in the substantial absence of oxygen.

9. As new compounds, ketimines having the general formula

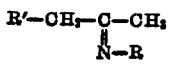

wherein R represents a lower alkyl of 1 to 2 carbon atoms and R' represents a member of the group consisting of phenyl, hydroxyphenyl and lower alkoxy phenyl.

10. As new compounds, ketimines having the general formula

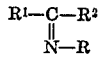

wherein R represents a lower alkyl while $R^1$ represents a phenyl-lower alkyl radical and $R^2$ stands for methyl.

11. As a new compound the N-methyl imine of phenylacetone.

References Cited in the file of this patent

UNITED STATES PATENTS

| | | |
|---|---|---|
| 1,799,110 | Manske | Mar. 31, 1931 |
| 1,822,548 | Ter Horst | Sept. 8, 1931 |
| 1,938,890 | Britton et al. | Dec. 12, 1933 |
| 2,045,574 | Adkins et al. | June 30, 1936 |
| 2,063,868 | Britton et al. | Dec. 8, 1936 |
| 2,160,058 | Covert | May 30, 1939 |
| 2,230,754 | Klavehn | Feb. 4, 1941 |
| 2,256,434 | Klavehn | Sept. 16, 1941 |
| 2,344,356 | Hildebrandt | Mar. 14, 1944 |
| 2,381,526 | Throdahl | Aug. 7, 1945 |
| 2,382,686 | Wenner | Aug. 14, 1945 |
| 2,407,167 | Kulz | Sept. 3, 1946 |
| 2,408,345 | Shelton et al. | Sept. 24, 1946 |
| 2,418,173 | Haury | Apr. 1, 1947 |
| 2,421,937 | Haury | June 10, 1947 |
| 2,422,013 | Haury et al. | June 10, 1947 |
| 2,498,419 | Haury | Feb. 21, 1950 |
| 2,504,122 | Goodson et al. | Apr. 18, 1950 |
| 2,533,723 | Dombrow | Dec. 12, 1950 |
| 2,583,729 | Deanesly | Jan. 29, 1952 |

FOREIGN PATENTS

| | | |
|---|---|---|
| 583,565 | Germany | Sept. 21, 1933 |
| 844,226 | France | Apr. 17, 1939 |
| 205,012 | Switzerland | Aug. 16, 1939 |
| 205,014 | Switzerland | Aug. 16, 1939 |
| 231,012 | Switzerland | May 1, 1944 |
| 573,120 | Great Britain | Nov. 7, 1945 |

OTHER REFERENCES

Adams et al.: "Organic Reactions," vol. 4, 1948, pp. 175-7, 189.